United States Patent [19]

Levitt et al.

[11] Patent Number: 5,572,425
[45] Date of Patent: Nov. 5, 1996

[54] POWERED ACTIVE SUSPENSION SYSTEM RESPONSIVE TO ANTICIPATED POWER DEMAND

[75] Inventors: Joel A. Levitt, Ann Arbor; Benjamin I. Bachrach, Dearborn; Michael B. Goran, Bloomfield Hills; James D. Grenda, Grosse Pointe; John E. Nametz, Ypsilanti, all of Mich.

[73] Assignee: Ford Motor Company, Dearborn, Mich.

[21] Appl. No.: 1,710

[22] Filed: Jan. 7, 1993

Related U.S. Application Data

[63] Continuation-in-part of Ser. No. 717,242, Jun. 18, 1992, Pat. No. 5,232,242.

[51] Int. Cl.$^6$ .................................................. B60G 17/015
[52] U.S. Cl. ...................................... 364/424.05; 280/707
[58] Field of Search ................................. 280/707, 709; 364/424.05, 424.01

[56] References Cited

U.S. PATENT DOCUMENTS

| | | |
|---|---|---|
| 3,884,496 | 5/1975 | Ito et al. . |
| 4,462,610 | 7/1984 | Saito et al. . |
| 4,625,994 | 12/1986 | Tanaka et al. . |
| 4,693,493 | 9/1987 | Ikemoto et al. . |
| 4,775,481 | 10/1988 | Allington . |
| 4,795,314 | 1/1989 | Prybella et al. . |
| 4,807,128 | 2/1989 | Ikemoto et al. . |
| 4,848,790 | 7/1989 | Fukunaga et al. . |
| 4,858,895 | 8/1989 | Buma et al. . |
| 5,071,158 | 12/1991 | Yonekawa et al. ................. 280/707 |
| 5,097,419 | 3/1992 | Lizell ............................... 364/424.05 |
| 5,142,477 | 8/1992 | Tsutsumi et al. ................. 364/424.05 |
| 5,159,554 | 10/1992 | Buma et al. ...................... 364/424.05 |
| 5,162,995 | 11/1992 | Ikemoto et al. .................. 364/424.05 |
| 5,174,598 | 12/1992 | Sato et al. ........................ 280/707 |
| 5,175,686 | 12/1992 | Oda et al. ........................ 364/424.05 |
| 5,231,583 | 7/1993 | Lizell ............................... 364/424.05 |
| 5,232,242 | 8/1993 | Bachrach et al. ................ 280/707 |
| 5,239,471 | 8/1993 | Takahashi ........................ 364/424.05 |

*Primary Examiner*—Kevin J. Teska
*Assistant Examiner*—Russell W. Frejd
*Attorney, Agent, or Firm*—Raymond L. Coppiellie; Roger L. May

[57] ABSTRACT

An active suspension system for a vehicle employing fluid powered force exertion units between the wheels and the vehicle body. The vehicle's engine operates a pump which provides pressurized fluid to operate the force exertion units under the control of a processing unit which monitors the rate of change of the power being consumed by the force exerting units and stores demand data indicative of the prior history of power demands placed on the engine by the suspension system. The processor calculates an autoregression moving average of the stored past demand values to form a prediction of future demand, thereby controlling the amount of power delivered by the engine in anticipation of the predicted needs of the force exertion units.

7 Claims, 5 Drawing Sheets

POWERED ACTIVE SUSPENSION SYSTEM RESPONSIVE TO ANTICIPATED POWER DEMAND

CROSS REFERENCE TO RELATED APPLICATION

This is a continuation-in-part of our application Ser. No. 717,242 filed Jun. 18, 1992, now U.S. Pat. No. 5,232,242 issued Aug. 3, 1993.

BACKGROUND OF THE INVENTION

The present invention relates to actively controlled suspension systems for engine powered vehicles and in particular to processor based active suspension systems that modify the torque output of the engine to accommodate changes in power consumption by the suspension system.

Active suspension systems are known to those skilled in the art. In general, active suspension systems control a vehicle's ride and handling. Active suspension systems control and maintain the vehicle's attitude, for example, elevation, roll and pitch. Suspension systems of this type sense the attitude of the car and, in response, provide fluid power to, or remove fluid power from, actuators to maintain and control the ride and handling of the vehicle. For example, Williams et al, U.S. Pat. No. 4,625,993, teaches a conventional active suspension system intended to maintain a vehicle substantially stable in all planes of movement irrespective of external forces acting upon the vehicle.

In general, active suspension systems, for example in automobiles and the like, include a source of pressurized fluid. The fluid source, for example a hydraulic pump, provides fluid power in the form of a pressurized working fluid to suspension units, one at each vehicle wheel. The pressurized fluid source is typically driven by torque provided by the vehicle's engine.

The fluid power provided by the pump is critical to the performance of the active suspension system because the response of the system depends upon the pump's ability to provide sufficient fluid power to dissipate and/or counteract undesirable external forces. The power demand upon the pump is, therefore, a function of the power requirements of the suspension units which are largely a function of the vehicle speed and the conditions of the road, including the road's "texture". As the conditions at each suspension unit change, the fluid power demanded and consumed by each suspension unit changes.

The pump's ability to meet the suspension unit's power demand, however, impacts the overall performance characteristics of the vehicle. That is to say, the load imposed upon the engine by the suspension system's pump has a bearing on the performance and response of the vehicle drive train. If the suspension system's pump too rapidly reduces the load it imposes on the engine, then the vehicle may experience undesirable surge. If the suspension system's pump excessively or rapidly loads the engine, then the vehicle may experience undesirable hesitation. The rate at which power is being provided to the pump at any given time is dependent upon the current vehicle conditions, including, for example, the engine speed, the throttle position, the transmission gear position, the spark advance, and the vehicle velocity.

Active suspension systems, like the system disclosed in Fukunaga et al, U.S. Pat. No. 4,848,790, adjust the pump's power consumption based primarily upon the speed of the vehicle. The pressure of the working fluid provided to the suspension units by the pump is dependent upon the speed of the vehicle. When the speed of the vehicle is below a reference value the suspension system provides fluid communication between a first pump and the hydraulic cylinders. The first pump provides fluid at a first fluid pressure. When the speed of the vehicle is above the reference value, the system provides fluid communication between a second pump and the hydraulic cylinders. The second pump provides fluid at a second fluid pressure where the second pressure is greater than the first.

Fukunaga et al type suspension systems focus upon the pump's unnecessary power consumption and the resulting degradation of fuel economy and drivability of the vehicle including the ability of the vehicle to accelerate on demand. Active suspension systems of this type vary the power consumption by the pump in an effort to limit unnecessary power consumption and reduce degradation of fuel economy and drivability.

The Fukunaga et al type suspension systems, however, are neither concerned with nor address the effects of the rate of change of the pump power demand and/or consumption on the vehicle's performance. These systems do not monitor the anticipated power demand of the pump and adjust the power supplied to the pump by the motor to meet the anticipated demand. Further, these systems do not monitor and control the rate of change of the pump's power demand and consumption.

There exists a need for an active suspension system that predicts the power demand by the system's pump and begins to modify the engine's state (e.g., speed and spark advance) so that the engine will be able to accommodate the anticipated power demand and/or consumption when it later occurs. There exists a need for a suspension system that limits the rate of change of the pump's power demand to a predetermined level. The predetermined level being the maximum level which the engine in its then current state can accomodate should the then maximum possible change of the power demand occur. Further, there exists a need for a system that can provide both and/or either of the two functions.

SUMMARY OF THE INVENTION

In a first principle aspect, the present invention is an active suspension system for a vehicle having an engine, a fluid providing means and a data processing means. The fluid providing means provides a pressurized fluid for the active suspension system wherein the fluid providing means is coupled to the engine for receiving power from the engine. The data processing means, which is coupled to the fluid providing means and the engine, calculates an anticipated power demand of the fluid providing means and controls the state of the engine so that the engine will be able to accomodate the anticipated power demand of the fluid providing means when it occurs.

In another principle aspect, the data processing means calculates the maximum value of the rate of change of the power demand of the fluid providing means that the engine, in its then current state, can accomodate should the largest possible changes in the power demand of the fluid providing means occur, and limits the rate of the change of the power demand of the fluid providing means so that the rate of change of the power demand of the fluid providing means cannot exceed that maximum value.

In another principle aspect, the present invention is a method of controlling the response of an active suspension system having a fluid pump to provide a pressurized fluid and an engine which provides power to the pump. The method includes the steps of calculating an anticipated rate of change of power demand by the pump and modifying the state of the engine so that it will be able to meet such anticipated power demand when and if it occurs.

Advantageously, the present invention can be implemented to assure than an active suspension system will not cause unacceptable vehicle hesitation or surge and secondarily, to operate the vehicle engine so that it is most able to provide the power that the suspension needs when it needs it. These and other features and advantages of the invention will be better understood from the following discussion of certain preferred embodiments.

BRIEF DESCRIPTION OF THE DRAWINGS

In the course of the detailed description of preferred embodiments to follow, reference will be made to the attached drawings, in which.

DESCRIPTION OF PREFERRED EMBODIMENTS

Figure 1:
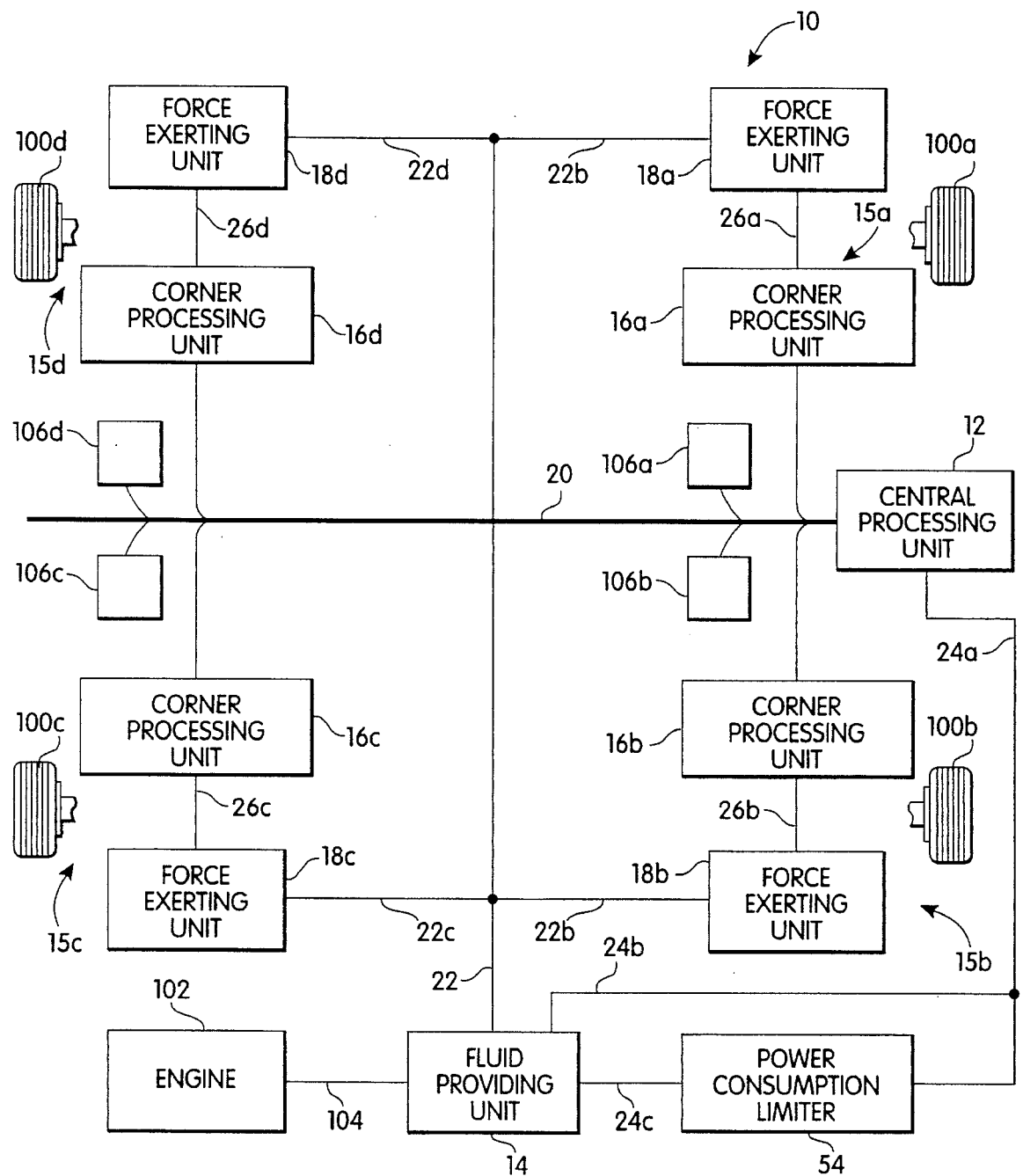
FIG. 1 is a schematic block diagram representation of an actively controlled vehicle suspension system according to a preferred embodiment of the present invention.

The power requirements of an active suspension system may change so much and over such a short period of time that the engine will be unable to adjust to the consequent change in the torque load placed upon it. In this case the result would be unacceptable vehicle surge or hesitation. However, no matter how great the rate of change of the power demand, if the magnitude of the change is small enough, it is not of concern. Similarly, a large change in the magnitude of the power demand is of no concern, if the rate of change is small enough. Accordingly, a primary power-requirement-related feature of the invention for operating an active-suspension-equipped vehicle is to assure that the torque load imposed on the engine by the suspension cannot change too much too fast.

From knowledge of an active suspension system, one can calculate the largest possible changes of pump power consumption. In preferred embodiments discussed below, these changes occur when all the power servovalves 34 close simultaneously or when all servovalves open to supply fluid to actuator chambers 38a or 38b at reservoir pressure and the pressure relief valve opens, simultaneously. These changes result in the largest changes in pump outlet pressure, and when the pump responds, they result in the largest possible decrease and the largest possible increase in suspension power consumption, respectively. By appropriately increasing the pump response time one can assure that these extreme events will not alter the torque load imposed by the suspension so quickly as to overtax the engine.

The greatest absolute rate of change of the torque imposed on the engine by the suspension, or, equivalently, of the suspension power consumption, that can be accomodated by the engine in the event of either of the just discussed extreme events depends on: the vehicle speed; the transmission gear position; the speed of the engine; the rates at which fuel and air are being metered to the engine; and the engine spark advance. All of this information can be provided to the suspension central processor, which can calculate the corresponding greatest acceptable absolute rate of change of suspension power consumption.

There are a diversity of ways in which the maximum absolute rate of change of the active suspension imposed torque can be limited. The variety of means available depends on the type of device used to supply power to the suspension system. In the case that the suspension power supply is a pressure compensated hydraulic pump, the pump senses pressure at its outlet and increases or decreases its pumping rate as this pressure is less than or greater than a previously established reference value. As the pumping rate increases or decreases, the torque load imposed on the engine correspondingly increases or decreases. In the case that the pump is a variable displacement pressure compensated axial piston pump, one way of limiting the rate of change of concern is to appropriately throttle the pump's pump-outlet-pressure-sensing channel.

A first feature of our invention, therefore, preferably comprises ongoing, moment to moment, calculation of the extreme changes in pump outlet pressure that are possible, consistent with the continued operation of the suspension system, and moment to moment calculation of the greatest absolute rate of change of suspension power that the engine can accomodate without unacceptable vehicle hesitation or surge in the event of the occurrence of the aforesaid extreme changes, and moment to moment adjustment of the response rate of the suspension power supply so that the greatest absolute rate of change is not exceeded.

Provided it is assured that the absolute rate of change of the load imposed on the engine will not exceed an acceptable value, a second feature of the invention provides, as nearly as possible, all the power (and no more) that the suspension system needs to function with maximum effect. The condition to be overcome to accomplish this is that without further modification the engine only begins to respond to a change in suspension system power requirements when the corresponding torque imposed on the engine by the suspension has been changed. Given the engine response time, that is often too late for the timely provision of the required power.

Accordingly, such second feature of our invention preferably comprises moment to moment prediction of the suspension system's power requirements at a plurality of times in the future of the time at which such predictions are made, and moment to moment adjustment of the fuel and/or air metering rates and/or the spark advance so as to begin to prepare the engine to accomodate predicted changes in suspension power requirements sufficiently in advance of their occurrence. These predictions will be more probably correct as they are predicted to occur at times more proximate to the time at which the predictions are made. However, even if the predicted changes do not, in fact, occur, the first feature stated above will still prevent unacceptable surge and hesitation.

Suspension power requirement predictions cannot be made with certainty, because the road input (i.e., the time varying forces exerted on the tires by the road) is random, which is also the reason that predictions are required at all. Useful predictions can be made, because while the road input is random it is not completely structureless, i.e., while future road input cannot be completely determined from its history, its history is a significant predicate to its future. Consequently, the histories of the wheels' vertical accelerations are significant predicates to their futures, and the history of the suspension system's power requirements is a significant predicate to its future. Suspension power requirements can be predicted from their history, alone, or from their history and the histories of the wheels' vertical accelerations, jointly.

The advance preparation of the engine to meet predicted suspension power requirements can be affected by using current engine controllers. The schematic block diagram in FIG. 1 is an illustration of a preferred embodiment of an active suspension system 10 according to the present invention. The active suspension system 10 employs a central processing unit 12 to coordinate the overall operation of the suspension system 10, including monitoring the rate of change of power demand and/or consumption by the fluid providing unit 14. In the illustrative embodiment, the active suspension system 10 includes four suspension units 15a–d, one for each vehicle wheel 100a–d, respectively. The central processing unit 12 calculates and transmits body force commands to the suspension units 15a–d. The central processing unit 12 utilizes information from several accelerometers and possibly other vehicle condition sensors to generate the body force command. The body force commands are the suspension response required at each suspension unit 15a–d necessary to respond to accelerations of the vehicle body and the vehicle wheels 100a–d.

Each of the suspension units 15a–d includes a corner processing unit 16a–d, respectively, which receives the body force command for its respective suspension unit. The corner processing units 16a–d first calculate necessary modifications to the body force commands due to local conditions, such as suspension position, suspension velocity or wheel acceleration. The corner processing units 16a–d then calculate, in response to the current conditions in force exerting units 18a–d, respectively, the adjustments necessary to achieve the force and/or wheel to body velocity required to meet the modified suspension command.

The central processing unit 12 communicates with the suspension units 15a–d and, in particular, the corner processing units 16a–d, over a multi-wire bus 20. In a preferred embodiment, the multi-wire bus 20 is a 2-wire serial communication link. However, an optical communication link, or an optical or multi-wire parallel link, are suitable alternatives.

The suspension units 15a–d further include force exerting units 18a–d, respectively. The force exerting units 18a–d respond to commands from the corner processing units 16a–d in suppressing external forces acting on the vehicle body so that it does not experience unwanted motions and/or in suppressing external forces acting on the vehicle wheels so that they maintain favorable contact with the road. The corner processing units 16a–d communicate with the force exerting units 18a–d, respectively, over multi-wires 26a–d, respectively.

The suspension units 15a–d, and particularly the force exerting units 18a–d, obtain fluid power from the fluid providing unit 14. The fluid providing unit 14 communicates with the force exerting units 18a–d via fluid conduit 22.

The central processing unit 12 also monitors the rate of change of power demand and consumption by the fluid providing unit 14 and controls the rate of change of power demand and/or consumption by the fluid providing unit 14. The actual rate of change of power demand and/or consumption by the fluid providing unit 14 is limited to an acceptable level, which is dependent upon the current vehicle conditions, including the engine speed, the throttle position, the transmission gear position, the spark advance and the vehicle velocity. The fluid providing unit 14 is driven by torque provided by the engine 102 of the vehicle. The fluid providing unit 14 is coupled to the engine 102 via mechanical coupling means 104. In a preferred embodiment, the mechanical coupling means 104 is an output shaft of the engine 102. That is, the fluid providing unit 14 is mechanically and drivingly connected to an output shaft of the engine 102 so as to be driven by the output torque of the engine 102.

The central processing unit 12 monitors the power demand and/or consumption by the fluid providing unit 14, and the rate of change thereof, in order to avoid unacceptable vehicle performance, for example, undesirable vehicle hesitation and/or surge due to an excessive change at an excessive rate of change of power consumption by the fluid providing unit 14.

The central processing unit 12 employs a power consumption limiter 54 to limit the power demand and/or consumption by the fluid providing unit 14 to an acceptable level. The central processing unit 12 calculates, depending upon the current vehicle conditions, the rate of change of power demand and/or consumption that is acceptable. The central processing unit 12 provides the power consumption limiter 54 with command and data signals. The power consumption limiter 54, in response, implements these commands and limits the rate of change of power demand and/or consumption by the fluid providing unit 14.

The central processing unit 12 communicates directly with the fluid providing unit 14 over multi-wires 24a and 24b. The central processing unit 12 also communicates with the power consumption limiter 54 over multi-wires 24a. The power consumption limiter 54 communicates with the fluid providing means 14 over multi-wires 24c.

Figure 2:
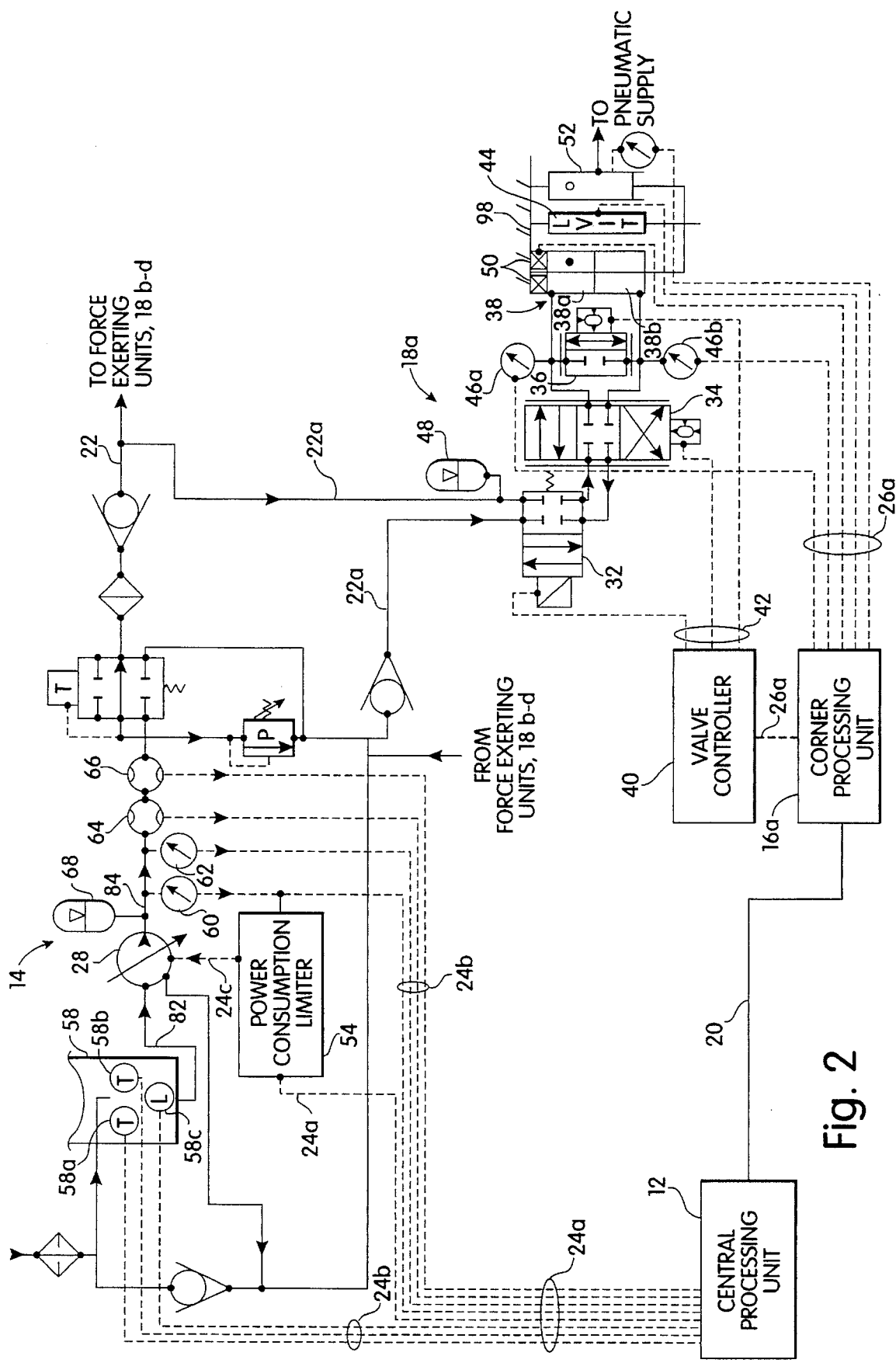
FIG. 2 is a more detailed schematic representation of an embodiment of a suspension unit of the actively controlled vehicle suspension system of FIG. 1.

In the preferred embodiment of FIGS. 1 and 2, each suspension unit 15a–d is substantially identical in function. Alternatively, however, the suspension units may vary to accommodate packaging and/or space constraints. Further, the suspension units may vary to provide a desired range of forces due to the vehicle weight distribution.

FIG. 2 provides a more detailed schematic representation of one of the suspension units 15a–d, particularly suspension unit 15a, in conjunction with central processing unit 12 and fluid providing unit 14. In the preferred embodiment of FIG. 2, the fluid providing unit 14 includes a pump 28, a reservoir 58, fluid pressure sensors 60 and 62, fluid flow sensor 64 and 66, and a noise attenuator or accumulator 68. The pump 28 may be of hydraulic or pneumatic type. In a preferred embodiment, the pump 28 is a variable displacement pressure compensated unidirectional type pumping mechanism. The active suspension system 10 employs the pump 28 to provide hydraulic fluid at a substantially constant pressure. In one preferred embodiment, the pump 28 supplies a flow rate to maintain the fluid pressure substantially constant at about 2500 psi in the fluid conduit 22.

The fluid pressure sensors 60 and 62 provide the central processing unit 12 with signals indicative of the fluid pressure of the fluid in the fluid conduit 22. The fluid flow sensors 64 and 66 provide the central processing unit 12 with signals indicative of the rate of fluid flow in the fluid conduit 22. The fluid pressure sensors 60 and 62 and the fluid flow sensors 64 and 66 communicate directly with the central processing unit 12 over multi-wires 24a and 24b.

The reservoir 58 includes temperature sensors 58a and 58b. The temperature sensors 58a and 58b provide the central processing unit 12 with signals indicative of the temperature of the fluid in the reservoir 58. The reservoir 58 also includes a fluid level sensor 58c which provides the central processing unit 12 with a signal indicative of the level of the fluid in the reservoir 58. The temperature sensors 58a and 58b and fluid level sensor 58c communicate directly with the central processing unit 12 over multi-wires 24a and 24b.

It should be noted that several of the sensors 58a, 58b, 58c, 60, 62, 64, and 66 provide somewhat redundant information, for example, fluid flow sensors 64 and 66. Having redundant sensor input is not necessary to the proper operation of the system 10.

In a preferred embodiment, force exerting unit 18a includes a protection valve 32, a power valve 34, a by-pass valve 36, and a cylinder 38 having a first chamber 38a and a second chamber 38b. The protection valve 32 is a 4-port electronically controlled, normally closed valve. Thus, there is no fluid communication through the valve unless it is actuated. The protection valve 32 is a two state device and, in its actuated state, provides fluid communication between the fluid providing unit 14 and the remaining elements of the force exerting unit 18a.

The power valve 34 is a 4-port electronically controlled, continuously adjustable, servovalve. The power valve 34 provides fluid communication between the cylinder 38 and the fluid providing unit 14.

The by-pass valve 36 is a 2-port electronically controlled, continuously adjustable, servo valve. The by-pass valve 36 provides fluid communication through the valve between the chamber 38a and 38b of the cylinder 38 in the default or normal state.

The force exerting unit 18a also includes a valve controller 40. The valve controller 40 functions as an interface between the corner processing unit 16a and the force exerting unit 18a. The corner processing unit 16a provides valve control signals to the valve controller 40 which, in turn, controls the position or states of the valves 32, 34 and 36. The corner processing unit 16a communicates with the valve controller 40 over multiwires 26a. The protection valve 32, power valve 34, and by-pass valve 36 are all responsive to signals from the valve controller 40. The valve controller 40 communicates with the valves 32, 34, and 36 over multi-wires 42. It should be noted that the function of the valve controller 40 may be fully incorporated within the corner processing unit 16a. Under those conditions, the corner processing unit 16a does not require a controller to interface with the valves 32, 34, and 36.

The force exerting unit 18a further includes position transducer 44, pressure sensors 46a and 46b, accumulator 48, load cell 50, and a single acting pneumatic actuator 52. The position transducer 44 provides information which is indicative of the instantaneous position of the piston in the cylinder 38. In a preferred embodiment, the position transducer 44 is a linear variable inductance transducer. The corner processing unit 16a communicates with the position transducer 44 over multi-wires 26a.

Figure 3A:
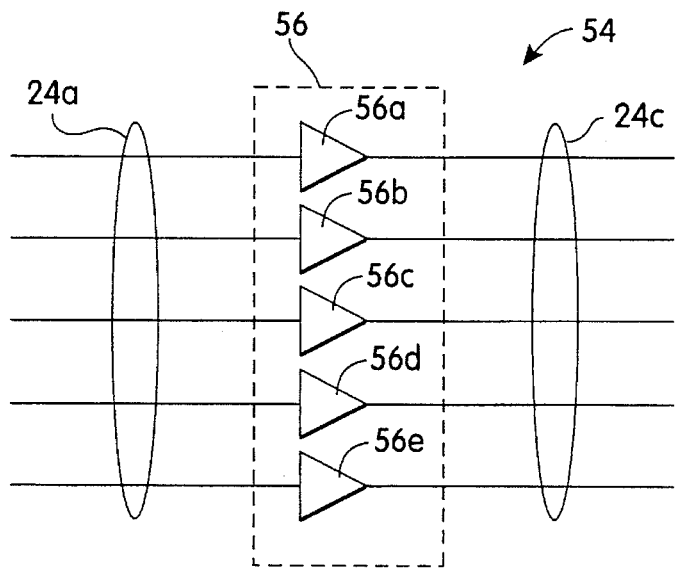
FIGS. 3A and 3B are schematic block diagrams of preferred embodiments of the power consumption limiter of the fluid providing unit of the actively controlled vehicle suspension system of FIG. 1.

In the preferred embodiment of FIG. 3A, the power consumption limiter 54 includes a bank of line drivers 56a–e. The line drivers 56a–e provide an electrical interface between the central processing unit 12 and the fluid providing unit 14. The line drivers 56a–e facilitate direct communication between the central processing unit 12 and the fluid providing unit 14. The commands sent by the central processing unit 12 are electrically adjusted by the line drivers 56a–e to allow the central processing unit 12 to directly manipulate the operating characteristics of the fluid providing unit 14 and particularly its rate of change of power demand and/or consumption.

Figure 3B:
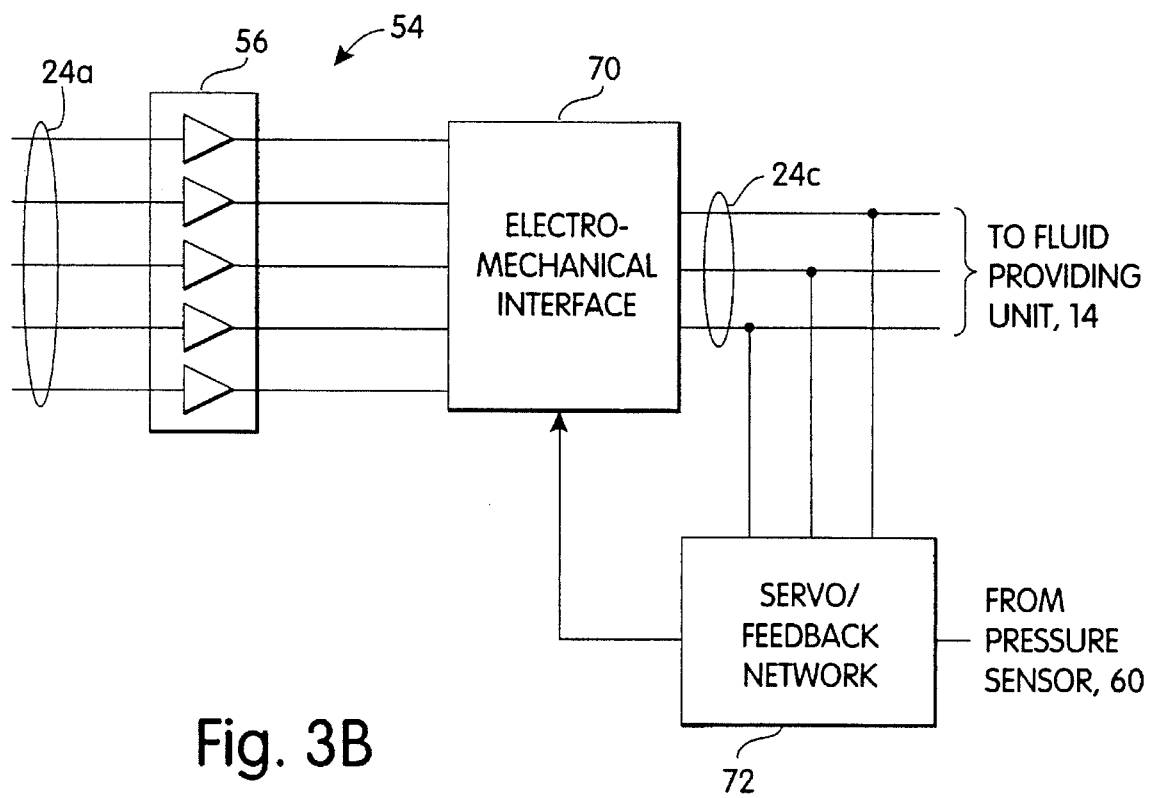

FIG. 3B illustrates another preferred embodiment of the power consumption limiter 54. Here, the power consumption limiter 54 includes the line drivers 56a–e as illustrated in FIG. 3A, and also an electro-mechanical interface 70 and servo/feedback network 72. The electro-mechanical interface 70 facilitates communication between the central processing unit 12 and the fluid providing unit 14 in situations where the fluid providing unit 12 includes a pumping control mechanism that is unable to communicate directly with the central processing unit 12. The electro-mechanical interface 70 and the servo/feedback network 72 continually monitor the response of the fluid providing unit 14 to control signals that limit its power consumption. The feedback network 72 provides the electro-mechanical interface 70 with signals that permit the interface 70 to adjust its commands to more accurately control the rate of change of power demand and/or consumption by the fluid providing unit 12.

In a preferred embodiment, system 10 utilizes a pressure compensated variable flow type pump 28, for example, an axial piston pumping mechanism or a radial piston pumping mechanism. A pressure compensated type pump is a pumping mechanism that is responsive to the pressure of the fluid at the outlet of the pump 28. When the fluid pressure at the outlet is less than a predetermined value, then the flow of fluid is increased. Alternatively, when the pressure of the fluid at the pump's outlet is greater than a predetermined value, then the flow of fluid is decreased.

Figure 4A:
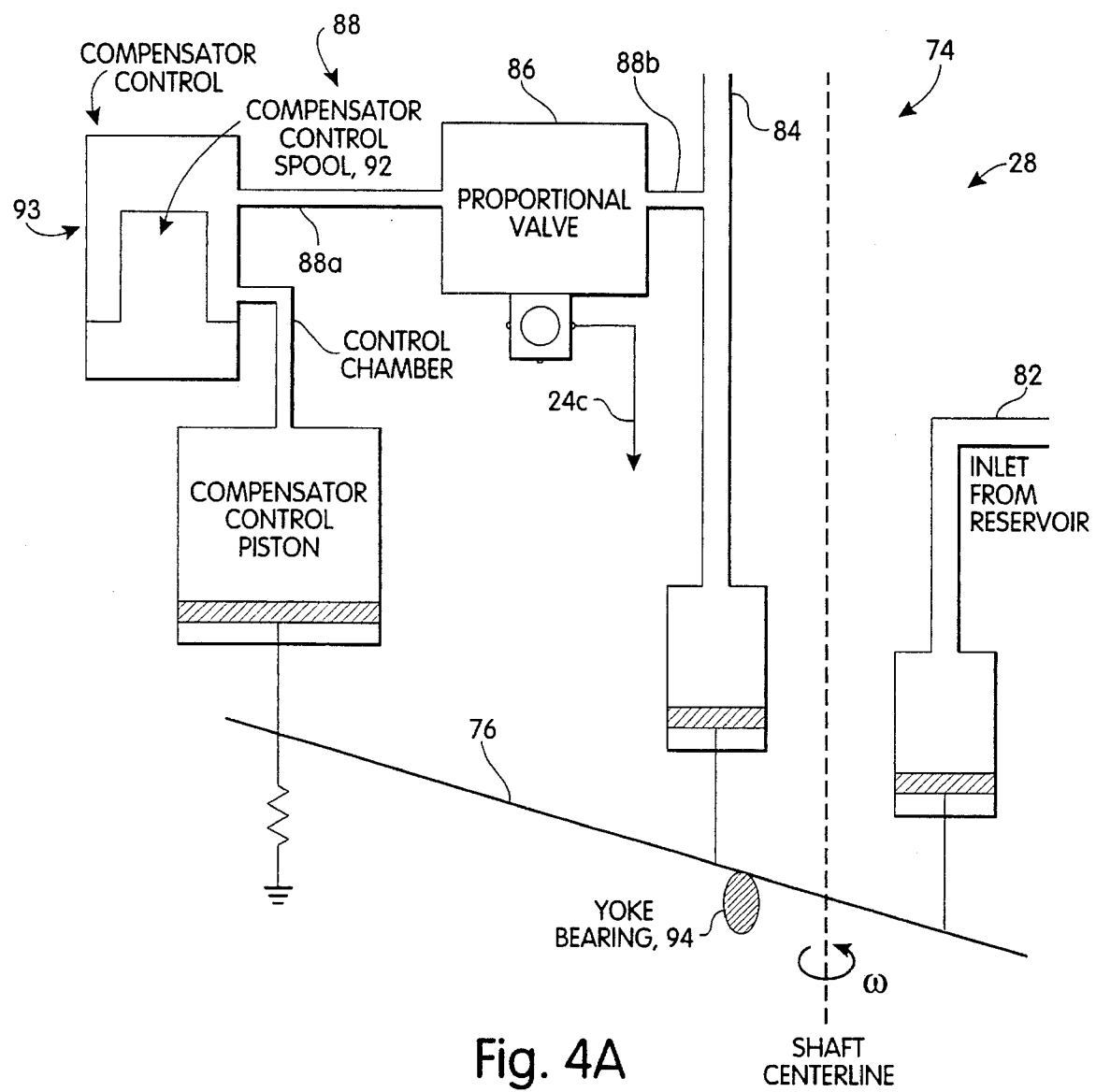
FIGS. 4A and 4B are schematic representations of preferred embodiments of the variable displacement unidirectional pump of the fluid providing unit of the actively controlled vehicle suspension system of FIG. 2.

In the preferred embodiment of FIG. 4A, the pump 28 may be an axial piston pumping mechanism 74, for example a model "PV" pump manufactured by Vickers Corporation of Troy, Mich. The rate of change of power consumption by the axial piston pumping mechanism 74 is controlled by manipulating the attitude of the swash plate 76. The rate of change of the power consumption is determined by the rate of change of the attitude of the swash plate 76. It should be noted that the rate of response of the axial piston pumping mechanism 74 to a change of pressure in its discharge line, i.e., pump fluid output conduit 84, is dependent upon the flow resistance of the sensing passage 88, the mass of the compensator control valve spool 92, the fluid damping of the valve spool of the compensator control 93, the moment of inertia of the swash plate 76 about the yoke bearing 94 and the fluid damping of the swash plate 76. The rate of change of the power demand and consumption may be controlled by manipulating any one or all or any combination of these variables or dependencies.

In a preferred embodiment, the rate of response of the axial piston pumping mechanism 74 is controlled by adjusting the flow resistance in the sensing passage 88. A proportional valve 86 is incorporated within the sensing passage 88 between the compensator control valve spool 92 and the fluid output conduit 84. The proportional valve 86 is incorporated within the sensing passage 88 thereby dividing the sensing passage 88, into passages 88a and 88b. The rate of change of the attitude of the swash plate 76 is adjusted by regulating the orifice of the proportional valve 86. The central processing unit 12 may be coupled to the pump 28 and, in particular, the proportional valve 86, through line drivers 56 to control and regulate the rate of change of the power demand and/or consumption by the pump 28.

As indicated above, in some applications it may be necessary or advantageous to employ the electromechanical interface 70 and servo/feedback network 72 of the power consumption limiter 54 to facilitate interfacing with and controlling the rate of change of displacement of the attitude of the swash plate 76 of the axial piston pumping mechanism 74.

Figure 4B:
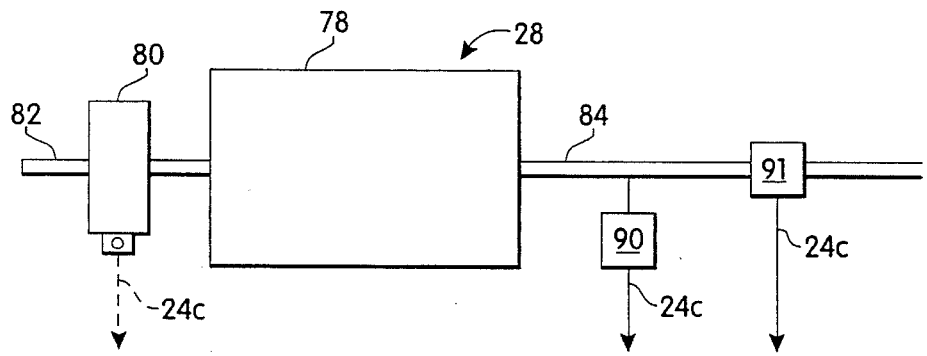

With reference to FIG. 4B, in another preferred embodiment, the pump 28 may be an electronically pressure compensated radial piston pumping mechanism 78, for example, model ZF-8604-988-130 manufactured by Zahnradfabrik Friedrichshafen ("ZF"), of Germany. The pump's flow rate is controlled by adjusting the flow resistance of an inlet valve 80 of the radial piston pumping mechanism 78. The pump's resident electronics uses a pressure sensor 90 to measure the pressure in the pump fluid output conduit 84 and increases or decreases the flow resistance of the inlet valve 80 according to whether the outlet pressure is greater than or less than a predetermined value. In a preferred embodiment, the central processing unit 12 limits the rate of change of pump power demand by changing the response time of the pump's resident electronics. A flow sensor 91 is also shown. In some applications it may be necessary or advantageous to employ the electro-mechanical interface 70 and servo/feedback network 72 of power consumption limiter 54 to facilitate interfacing with and controlling the inlet valve 80 of the radial piston pumping mechanism 78.

In operation, the system 10 is designed such that the fluid providing unit 14 provides fluid to the force exerting units 16a–d at a substantially constant pressure. The rate of change of power demand and consumption by the pump 28 is limited to a predetermined level, which is dependent upon the current vehicle conditions, including, the engine speed, the throttle position, the transmission gear position, the spark advance, and the vehicle velocity. Since the pump 28 is driven by the torque of the engine 102, the pump's power demand and/or consumption and the rate of change thereof are monitored and controlled by central processing unit 12 in order to avoid undesirable vehicle performance, for example, hesitation and/or surge due to an excessive change at an excessive rate of change of power consumption by the pump 28.

In one embodiment, the central processing unit 12 calculates the rate of change of the power demand and consumption of the pump 28 directly. The power consumption of the pump 28 is calculated by the central processing unit 12 from the information provided by the sensors 60, 62, 64 and 66. The rate of change of power demand and consumption of the pump 28 ($R_p$) is equal to the time derivative of the magnitude of the useful power being delivered by the pump 28 divided by the efficiency of the pump 28 and may be expressed as:

$$R_p = d|[P*Q/\upsilon(P,T,S)]|/dt;$$

where:

P=outlet pressure of the pump;

Q=outlet volume flow rate;

$\upsilon$=efficiency of the pump;

T=inlet fluid temperature of the pump; and

S=rotational speed of the pump—(the rotational speed of the pump may be estimated from the engine speed).

Although not indicated as such, it should be noted that the value of these variables are time varying.

In view of this disclosure, it will be readily appreciated by those skilled in the art that there exist several other methods of calculating the power consumption of the pump 28 and the rate of change of the power demand and/or consumption of the pump 28, for example, by employing various types of power sensors on the pump 28.

In another embodiment, the central processing unit 12 calculates the rate of change of the power demand and/or consumption by time averaging the sum of the current power consumption by the suspension units 15a–d (the power consumed by the suspension units 15a–d in responding to the current body force command). The central processing unit 12 transmits the suspension response command to each corner processing unit 16a–d. Each corner processing unit 16a–d first calculates necessary modifications to the body force commands due to local conditions such as suspension position, suspension velocity or wheel acceleration. The corner processing units 16a–d then calculate, in response to the current force conditions measured by the load cell 50 and the current relative displacement of the wheels 100a–d from the vehicle body 98 measured by the position transducer 44, the adjustments necessary to meet the modified suspension command demanded by the central processing unit 12. The corner processing units 16a–d then compute the fluid power consumed by the force exerting unit 18a–d, respectively, in making these adjustments. The corner processing units 16a–d calculate the power consumption by the suspension unit 15a–d, respectively, from the product of the pressure of the fluid in fluid conduit 22 and the current flow rate of the fluid (the flow of the fluid required for that force exerting unit 16a–d to respond to the body force command) in the force exerting units 18a–d. The corner processing units 16a–d report to the central processing unit 12 the power consumption by the suspension units 15a–d.

The central processing unit 12, having data representative of the power consumption by all of the suspension units 15a–d, then calculates the total power consumed by all of the suspension units 15a–d. The central processing unit 12 calculates the rate of change of the power demand and/or consumption by the pump 28 from the sum of the current power consumption by the suspension units 15a–d (the power consumed by the suspension units 15a–d in responding to the current body force command) divided by the efficiency of the pump 28. The efficiency of the pump 28 may be expressed, as detailed above, as a function of temperature, rotational speed, and pressure. In this embodiment, the rate of change of power consumption of the pump 28 may be expressed as:

$$R_p = \Sigma_i \, d|[P*V_i*A_i/\upsilon(P,T,S)]|/dt;$$

where:

i=the number of force exerting units 18;

P=outlet pressure of the pump;

$A_i$=the area of the $i^{th}$ piston; velocity;

$V_i$=the $i^{th}$ wheel 100a–d to body 98 velocity;

$\upsilon$=efficiency of the pump;

T=inlet fluid temperature of the pump; and

S=rotational speed of the pump—(the rotational speed of the pump may be estimated from the engine speed).

Although not indicated as such, it should be noted that these variables are time varying.

As mentioned above, if the rate of change would be greater than an acceptable level, depending upon the aforementioned current conditions of vehicle 30, then the power consumption limiter 54, engaged by the central processing unit 12, prevents the rate of change in the power demand and consumption by the pump 28 from exceeding the acceptable level.

The acceptable rate of change of power consumption by pump 28 may be calculated by the central processing unit 12. The acceptable level of power demand and consumption by the fluid providing unit 14 varies depending upon the momentary ability of the vehicle engine 102 to change the rate at which it can deliver power. The acceptable power consumption level of the fluid providing unit 14 is predetermined in that it is dependent upon a preselected set of current vehicle conditions, preferably including the engine speed, the throttle position, the transmission gear position, the spark advance and the vehicle velocity, and is calculated in accordance with pre-loaded alogorithm, as discussed herein. The central processing unit 12 acquires data representative of the current vehicle conditions from appropriate sensors in accordance with general techniques well known to those skilled in the art.

When the suspension system 10 employs an axial piston pumping mechanism 74, the central processing unit 12 may control the rate of change of power demand and consumption by the pump 28 by manipulating any of the factors that determine the speed of response of the pumping mechanism 74 to changes in the pump outlet pressure. In one preferred embodiment, the central processing unit 12 controls the rate of change of power demand and consumption by the pump 28 by manipulating the flow resistance ($r_f$) of the proportional valve 86.

One implementation of said preferred embodiment involves the measurement of the maximum absolute rate of change ($R_p$) of the power consumption of the pump 28 in response to a step change in pump outlet pressure of magnitude $\delta P$ when the value of the outlet pressure of the pump 28 had previously been P and the value of the flow resistance of the proportional valve 86 is $r_f$. Such measurements can be made by anyone skilled in the art. In this implementation, the functional dependence of $R_p$ on P, $\delta P$, and $r_f$ is established by a plurality of such measurements, and the dependence of $r_f$ on the values of $R_p$, P and $\delta P$ is provided to the central processing unit 12 either in a lookup table or in the form of the coefficients of a polynomial in P, $\delta P$ and $R_p$, established by least squares fitting to the measured data. Further, in this implementation, the central processing unit 12 from moment to moment: being informed of the then current value of P, as aforesaid; having calculated the then current maximum absolute change in P that could possibly occur, as aforesaid, and having calculated the then current maximum absolute rate of change in the power that is provided to the pump 28 by the engine 12 that is compatible with the then current state of the engine 12, as aforesaid, determines the value to which to set $r_f$ from the lookup table or from the polynomial by taking the values of P, $\delta P$ and $R_p$ to be equal to the then current value of P, the then current maximum absolute change in P that could possibly occur, and the then current maximum that is compatible with the then current state of the engine 12, respectively. Finally, the central processing unit sets $r_f$ to the thus determined value. With the aid of the present disclosure other suitable implementations will be readily apparent to those skilled in the art, for example, the functional dependence of $R_p$ on P, $\delta P$, and $r_f$ may be established analytically by employing an adequately accurate computer model of the pump 28.

When the suspension system 10 employs the radial piston pumping mechanism 78, the central processing unit 12 may control the rate of change of power demand and consumption by the pump 28 by manipulating any of the factors that determine the speed of response of the radial piston pumping mechanism 78 to changes in the pump outlet pressure. In one preferred embodiment, the central processing unit 12 controls the rate of change of power demand and consumption by the pump 28 by manipulating the bandwidth of the pump-resident pressure compensation electronics. In this embodiment, the pump-resident electronics incorporates an electronic low pass filter with voltage controlled bandwidth. Such filters are described in many texts, for example, *ELECTRONICS CIRCUITS MANUAL*, by J. Markus, published by McGraw-Hill Book Company, New York (1971), which is herein incorporated by reference. The control voltage ($V_B$) imposed is by the central processing unit 12. The electrical output of the pump outlet pressure (P) sensor 90 is filtered through this filter, and the pump resident electronics uses this filtered electrical output to provide pressure compensation by controlling the flow limiting inlet valve 80. As $V_B$ is made more negative, the bandwidth of the filter becomes narrower, and the pump response to changes in pump outlet pressure becomes slower.

One implementation of said preferred embodiment involves the measurement of the maximum absolute rate of change ($R_p$) of the power consumption of the pump 28 in response to a step change in pump outlet pressure of magnitude $\delta P$ when the value of the outlet pressure of the pump 28 had previously been P and the value of the bandwidth control voltage is $V_B$. Such measurements can be made by anyone skilled in the art. In this implementation, the functional dependence of $R_p$ on P, $\delta P$, and $V_B$ is established by a plurality of such measurements, and the dependence of $V_B$ on the values of $R_p$, P and $\delta P$ is provided to the central processing unit 12 either in a lookup table or in the form of coefficients of a polynomial in P, $\delta P$ and $R_p$, established by least squares fitting to the measured data. Further, in this implementation, the central processing unit 12 from moment to moment: being informed of the then current value of P, as aforesaid; having calculated the then current maximum absolute change in P that could possibly occur, as aforesaid, and having calculated the then current maximum absolute rate of change in the power that is provided to the pump 28 by the engine 12 that is compatible with the then current state of the engine 12, as aforesaid, determines the value to which to set $V_B$ from the lookup table or from the polynomial by taking the values of P, $\delta P$ and $R_p$ to be equal to the then current value of P, the then current maximum absolute change in P that could possible occur, and the then current maximum absolute rate of change in the power that is provided to the pump 28 by the engine 12 that is compatible with the then current state of the engine 12, respectively. Finally, the central processing unit sets $V_B$ to the thus determined value. With the aid of the present disclosure other suitable implementations will be readily apparent to those skilled in the art, for example, the functional dependence of $R_p$ on P, $\delta P$, and $V_B$ may be established analytically by employing an adequately accurate computer model of the pump 28.

The preferred embodiments described above detail an active suspension system 10 that controls the rate of change of the power demand of the fluid providing unit 14 to limit the rate of change of power demand and/or consumption below a predetermined level which depends upon the current vehicle conditions. In those instances where the restriction of the rate of change of power demand and/or consumption by the pump 28 prevents the pump 28 from providing the full measure of fluid power required by the suspension system 10, the suspension system 10 will not perform entirely as originally demanded or anticipated by the central processing unit 12 and corner processing units 16a–d. Under these circumstances, the pump 28 will be unable to provide a substantially constant fluid pressure in fluid conduit 22.

To alleviate this occurrence, the central processing unit 12 monitors the power demand and/or consumption by the fluid providing unit 14, the rate of change thereof, the anticipated power demand and/or consumption of the fluid providing unit 14, and the rate of change thereof, so that it may prepare the engine 102 to provide the anticipated power demand which is necessary to reduce degradation of vehicle suspension performance.

Briefly, by way of background, power demand and consumption of the pump 28 is a response to power demand of the suspension units 15a–d. The power requirements of the suspension units 15a–d are largely a function of the vehicle speed, vehicle acceleration or deceleration, vehicle steering maneuvers and the conditions or characteristics of the road. As these variables change, the suspension system 10 responsively changes to provide a desired suspension response. This causes the conditions at each suspension unit 15a–d to change which, as described above, impacts upon the fluid power demanded and consumed by each suspension unit 15a–d. This in turn causes variations in the power demand of the pump 28.

It is not necessary to predict power demand changes due to vehicle acceleration or due to steering maneuvers, which the vehicle operator elects to perform. In such cases, vehicle operators are accustomed to using their accelerator and brake pedals, and this does not interfere with their operation of the vehicle. It is significant, however, to predict and adjust the engine 102 to power demand changes due to changes in the road input (i.e., the time varying forces exerted on the tires by the road). Such prediction is possible, because road input is not perfectly disordered. While the history of road input is not completely determinative of its future, it is a significant predicate to its future. The vertical accelerations of the wheels 100 relative to the vehicle body 98 are, essentially, responses to the road input, and, it follows, that the histories of the wheels' vertical accelerations are significant predicates to their futures. The power demand of the pump 28 is, essentially, a response to the vertical motions of the wheels, and it follows that the history of the power demand of the pump 28 is a significant predicate to its future. It should be noted that the power demand of the pump 28 is somewhat more orderly than the road input because of the filtering effect of the accumulators 48 and 68.

Processes such as road input, wheel vertical acceleration and power demand are often referred to as Markoff processes. Markoff processes are discussed in many statistics texts, for example, *INTRODUCTION TO STATISTICAL COMMUNICATION THEORY,* by D. Middleton, published by McGraw-Hill Book Company, New York (1960), which is herein incorporated by reference. There are four preferred methods of prediction of the power demand of the pump 28. Three of these methods predict the power demand from its own history, alone. The fourth uses the history of the vertical accelerations of the wheels 100, as well. With the aid of the present disclosure, other suitable methods will be readily apparent to those skilled in the art.

The three preferred methods of predicting the power demand from its own history, alone, all use AutoRegressive Moving Average (ARMA) models to model the power demand. One of these methods is most suitable when the power demand is linearly related to the road input, and the road input is stationary (i.e, when the statistics of the road input are time invariant). This method will hereinafter be referred to as the "ARMA method". The second is most suitable when the time derivative of the power demand is linearly related to the road input, and the road input is stationary. This method will hereinafter be referred to as the "ARIMA method". The third method is most suitable when the power demand is nonlinearly related to the road input and/or the road input is nonstationary. This method will hereinafter be referred to as the "TARMA method".

The preferred method of predicting the power demand from both its history and the history of the vertical accelerations of the wheels 100 uses an AutoRegressive Moving Average with eXogeneous input (ARMAX) model to model the power demand. This method will hereinafter be referred to as the "ARMAX method".

Methods such as the four just identified are among the methods known as methods of parametric stochastic signal processing, and a brief description of each method and experimental validation of the results are presented below. For more information, such methods are dealt with in detail in many texts, for example: *SYSTEM IDENTIFICATION THEORY FOR THE USER,* by L. Ljung, published by Prentice Hall, Englewood Cliffs (1987) and *TIME AND FREQUENCY REPRESENTATIONS OF SIGNALS AND SYSTEMS,* edited by G. Longo and B. Picinbono, published by Springer-Verlag, New York (1989), which are herein incorporated by reference.

Of the methods of predicting power demand from its own history, alone, both the ARMA and ARIMA methods are based on three ideas.

The first idea is that the numerical solution of linear differential equations involves solving a related difference equation, and, thus, the modeled signal S(t) and the road input E(t) are related by:

$$S_0 \sigma_1 S_1 + \sigma_2 S_2 + \ldots + \sigma_{u-1} S_{u-1} = E_0 \qquad (1)$$

where:

$S_j = S(t-j\delta t)$, $E_0 = E(t)$, and the coefficient σ's are constants.

The second idea is that every stationary random signal can be produced by linearly filtering white noise, and, thus, $$E_0 = W_0 + e_1 W_1 + e_2 W_2 + \ldots + e_{v-1} W_{v-1} \qquad (2)$$

where:

$W_j$ is the value of a realization of white noise at time $t+j\delta t$, and the coefficient e's are constants.

The third idea is that since the response of a linear system to a sum of excitations is the sum of its responses to each excitation, separately, if we know the transfer function, $T(\Omega)$, which describes the system response to a sinusoidal excitation at angular frequency $\Omega$ and we know the spectrum of the white noise, $W(\Omega)$, then we can calculate the signal spectrum, $S(\Omega)$, and, thus:

$$S(\Omega) = T(\Omega) \cdot W(\Omega)$$

where, $$T\Omega = \frac{1 + e_1 \exp(-i\Omega\delta t) + e_2 \exp(-i2\Omega\delta t) + \ldots + e_{v-1}\exp(-i[v-1]\Omega\delta t)}{1 + \sigma_1 \exp(-i\Omega\delta t) + \sigma_2 \exp(-i2\Omega\delta t) + \ldots + e_{u-1}\exp(-i[u-1]\Omega\delta t)},$$

and $$W(\Omega) = <W> \exp[i\Theta(\Omega)]$$

Θ(Ω) being random, with equal probability of having any value in [−π, +π].

Combining Eqs (1 & 2) results in:

$$S_0 + \sigma_1 S_1 + \ldots + \sigma_{u-1} S_{u-1} = W_0 + e_1 W_1 + \ldots + e_{v-1} W_{v-1}, \quad (3)$$

and the constant coefficients are determined by: preparing a calibration set of values of S measured at intervals of δt, which is used to calculate S(Ω); writing [1/T(Ω)·S(Ω)= W(Ω), where 1/T(Ω) is known as the inverse transfer function, and using a least squares process to calculate those σ's and e's that minimize the variance of W.

Eq(3) is used to predict the one-step-ahead signal value, $S_0$, with probable error equal to $W_0$ by simply substituting the values measured at the u−1 previous times t−jδt, (j=1,2, ..., u−1). The two-step-ahead value is predicted, this time with probable error equal to $W_{-1} + e_1 W_0$, by substituting the just computed prediction and the values measured at the u−2 previous times into Eq(3). This process can be continued to calculate the k-step-ahead prediction, $S_{1-k}$, with a probable error that increases with increasing k.

In the ARMA method the signal is the power demand, and it is predicted, accordingly.

In the ARIMA method the signal is the time derivative of the power demand. The derivative of the power demand is predicted, accordingly, and the predicted power demand is obtained by integrating.

In the case of the TARMA method, it is not assumed that the active suspension system is linear, so no transfer function can be defined, nor is it assumed that the road input is stationary. Nonetheless, the TARMA method is an extension of the ARMA method.

During a sufficiently short time interval, and, correspondingly, when the power demand signal is confined to a sufficiently small interval of its dynamic range: the active suspension system can be approximated by a linear system; the road input is almost always stationary, and the power signal is approximately stationary. Thus, in this short interval the signal can be modeled using an ARMA model, of the form of Eq(3).

If the entire dynamic range of the power demand signal is divided into intervals each of which is small enough for valid linear approximations, then we obtain a set of ARMA models each with the same form, that of Eq(3), but different from each other in the values of their coefficients. For most nonlinear systems, if we pass to the limit of infinitely many differential intervals, then our set of ARMA models becomes a single model of the form of Eq(3) with the modification that the coefficient σ's and e's are almost always continuous functions of time, where $$\sigma_j = \sigma_j(t - j\delta t) \text{ and } e_j = e_j(t - j\delta t).$$

Thus, we have a Time varying coefficients ARMA model, which is referred to as a TARMA model. To determine these coefficient functions, we use the fact that there exist functions $f_j(t - j\delta t)$ that are equal to linear combinations of the σ's and e's, such that:

$$S_0 + \sum_{r=1}^{\infty} (g_r S_r) = W_0 \quad (4)$$

In principal, measured signal values are used to determine the g's and W's by a mean square process that minimizes the variance of $W_0$. The g's, having been thus determined, are used to determine the σ's and e's, and predictions can then be made, just as in the cases of the ARMA and ARIMA methods.

Actually, in practicable calculations only a finite number of quantities can be calculated. Therefore, the g's, σ's and e's must be represented by a partial sum of their projections on some set of orthogonal basis functions, truncating their Fourier series expansions at some order w is a useful example. Further, the infinite series in Eq(4) must be truncated, too, for instance at order x. Having made these truncations, σ's and e's can be determined. However, these necessary truncations introduce errors, so a linear iterative procedure is used to minimize this error before making predictions.

The best values of the indices (u and v in the cases of the ARMA and the ARIMA methods and u, v, w, and x in the case of the TARMA model) are those values that minimize the variance of the prediction errors. In all three ARMA-model-based methods the best values of the indices can be determined using hill climbing procedures.

Figure 5A:
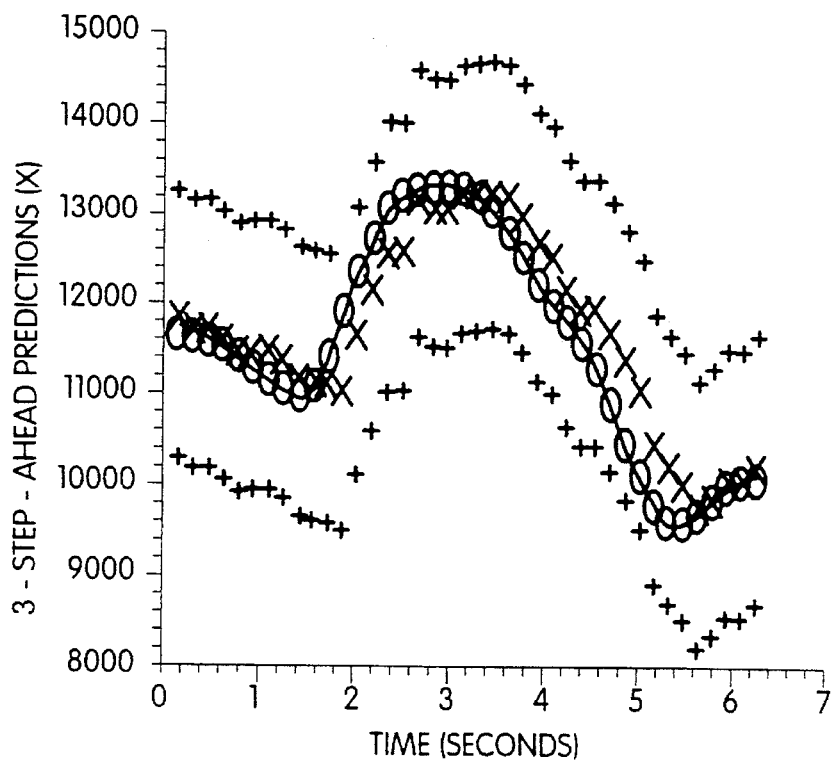
FIG. 5 is a graphical comparison of the TARMA METHOD predictions of power demand and experimentally measured values.
Figure 5B:
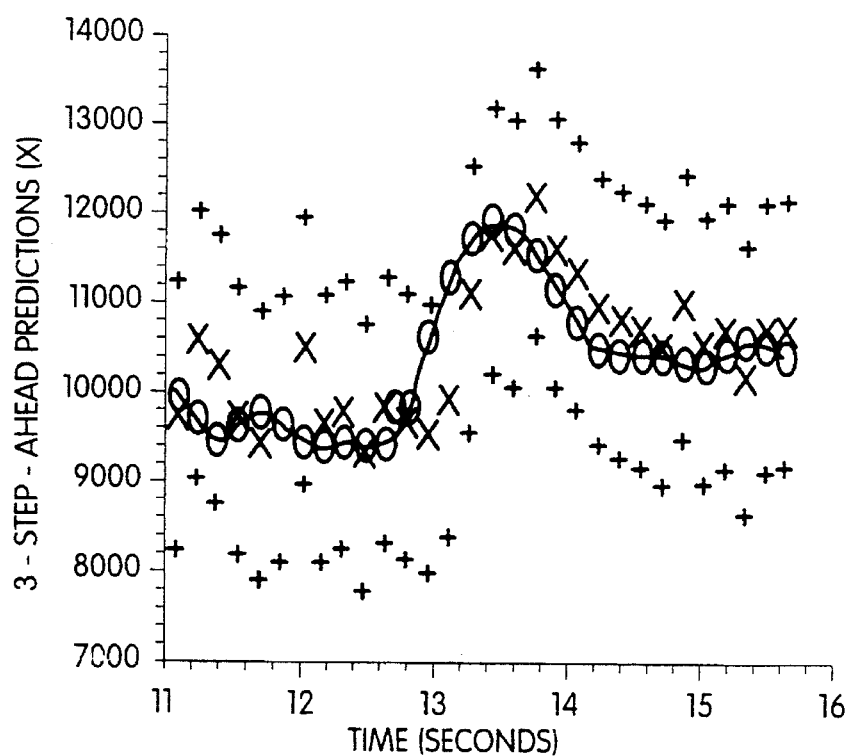

The coefficients of each of the ARMA model based methods were determined using the time varying power consumption of an experimental active-suspension-equipped vehicle, measured while the vehicle was driven on a test track with diverse road surfaces. These data were, also, used to evaluate the accuracy of their predictions. The TARMA model predictions were found to be most accurate. The accuracy of the half-second-ahead TARMA method predictions is illustrated in FIG. 5. Specifically, FIG. 5 shows 3-step-ahead TARMA (0.468 seconds) predictions, where "0" data points indicate actual values of power consumption, "X" data points indicate predictions, and "+" data points indicate boundaries of 95% confidence intervals.

The ARMAX method, the method that predicts the power demand from both its history and from the history of wheel vertical acceleration, assumes that the power demand, S, is modeled by:

$$S_0 + \sigma_1 S_1 + \ldots + \sigma_{u-1} S_{u-1} = x_0 X_0 + x_1 X + \ldots + x_{v-1} X_{v-1} + W_0 + e_1 W_1 + \ldots + e_{w-1} W_{w-1}, \quad (3)$$

where $X_j = X(t - j\delta t)$ is the wheel vertical acceleration at time t+jδt and the constant coefficient σ's, x's and e's are determined using the maximum likelihood method.

In the ARMAX method, wheel acceleration is used as a leading indicator, since the wheels experience the road input first. If wheel acceleration correlates strongly with power demand, then predictions can be expected to be better than in the case of the other two constant coefficient methods, the ARMA and ARIMA methods.

In the active suspension system this correlation is not strong, perhaps because the different inputs from each wheel are filtered by the corner accumulators 48 and mixed together and filtered by the supply accumulator 68.

Given the best values of the indices and of the coefficients, each of the just described four methods for predicting the power demand is suitable for implementation on the central processor 12. For example, in the case of the experimental vehicle used to take data for coefficient determination and prediction accuracy evaluation, it was found that representing the coefficient functions by their truncated Fourier expansions the best values of the TARMA method indices were (u, v, w)=(8, 8, 2). It can be seen from Eq(3) that, with these index values, making accurate three-step-ahead (i.e., 0.47-second-ahead) predictions requires only three successive summations of 80 double products. In the case of the TARMA method, given the best values of the indices, it is also practical to discover the best values of the coefficients on-board the vehicle using the central processor 12.

The prediction algorithms are implemented by the central processing unit 12. The central processing unit 12 may prepare the engine 102 to meet the predicted power demand of the pump 28 by modifying the throttle and choke positions with electronic engine control, as well as the spark advance, enabling a satisfactory suspension response by active suspension system 10.

Various preferred embodiments of the present invention have been described. It should be understood, however, that changes and modifications can be made without departing from the true scope and spirit of the present invention as defined by the following claims, which are to be interpreted in view of the foregoing.

What is claimed is:

1. An active suspension system for a vehicle having an engine, a plurality of wheels, and sprung and unsprung masses, comprising:

fluid providing means for providing a pressurized fluid to said active suspension system, wherein said fluid providing means is coupled to said engine for receiving power from said engine; and data processing means, coupled to said fluid providing means and to the engine, for calculating a prediction value indicative of the magnitude of the future power demand to be placed on said engine by said fluid providing means, and means responsive to said prediction value for controlling the amount of power produced by said engine to anticipate the power requirements of said fluid providing means.

2. The active suspension system of claim 1 further including means for storing demand history data representing the past power demands placed on said engine by said fluid providing means, wherein said processing means calculates said prediction value based on said demand history data.

3. The active suspension system of claim 1 further including means for storing data indicative of the past vertical acceleration experienced by said wheels, wherein said processing means calculates said predicted value based on the combination of said demand history data and said past acceleration data.

4. The active suspension system of claim 1 wherein said processing means comprises means for calculating a rate of change value indicative of the actual rate of change of power demand placed on said engine by said fluid providing means and wherein said means for controlling the amount of power produced by said engine further includes means for preventing said rate of change of power demand from exceeding a predetermined value.

5. In combination with a vehicle having an engine equipped with an electronic engine controller for varying the output power delivered by said engine, an active suspension system for supporting the body of said vehicle on wheels which are subjected to vertical motion relative to said body as said wheels move over an uneven road surface, said suspension system comprising, in combination:

means for generating body force commands in response to the sensed dynamic motion of said wheels and said body, force exerting means for applying a variable force between said wheels and said vehicle body in response to body force commands, power transfer means coupling said engine to said force exerting means to provide power to said force exerting means to enable said force exerting means to respond to said body force commands, means for storing data values indicative of past magnitudes of power delivered to said force exerting means from said engine, and means for processing responsive to said data values to form prediction values indicative of the expected future magnitude of power which will be required by said force exerting means, and means responsive to said prediction values for varying the amount of power produced by said engine in anticipation of the future magnitude of power which will be required by said force exerting means.

6. The active suspension system of claim 5 further comprising, in combination, means for storing acceleration data values indicative of the past motion of said wheels relative to said body, wherein said means for processing said data values to form prediction values is further responsive to said acceleration data values.

7. The active suspension system of claim 5 wherein said means for processing said data values forms said predicted values by calculating the autoregression moving average of said data values.

* * * * *